(12) United States Patent
Turos

(10) Patent No.: US 6,397,989 B2
(45) Date of Patent: Jun. 4, 2002

(54) APPARATUS FOR REDUCING HARMONICS AND VIBRATIONS OF A ROTATABLE BASE PIECE

(75) Inventor: Kenneth Turos, Albuquerque, NM (US)

(73) Assignee: Sun Standard, Inc., NE Albuquerque, NM (US)

( * ) Notice: Subject to any disclaimer, the term of this patent is extended or adjusted under 35 U.S.C. 154(b) by 0 days.

(21) Appl. No.: 09/970,722

(22) Filed: Oct. 4, 2001

Related U.S. Application Data

(63) Continuation-in-part of application No. 09/249,514, filed on Feb. 12, 1999.

(51) Int. Cl.$^7$ ................................................. F16F 7/10
(52) U.S. Cl. ........................................ 188/380; 74/574
(58) Field of Search ................................ 188/379, 380; 74/574

(56) References Cited

U.S. PATENT DOCUMENTS

| | | | | |
|---|---|---|---|---|
| 3,611,830 A | * | 10/1971 | Shank | 74/574 |
| 3,774,472 A | * | 11/1973 | Mitchell | 74/574 |
| 3,774,473 A | * | 11/1973 | Mitchell | 74/574 |
| 4,043,431 A | * | 8/1977 | Ellege | 188/1 B |
| 4,126,066 A | * | 11/1978 | Wagor et al. | 82/4 A |
| 4,656,899 A | * | 4/1987 | Contoyonis | 82/34 R |
| 4,678,066 A | * | 7/1987 | Heintz | 188/218 A |
| 5,095,786 A | * | 3/1992 | Bellinghausen et al. | 82/112 |
| 5,215,616 A | * | 6/1993 | Fillar | 156/173 |
| 5,262,599 A | * | 11/1993 | Aguirre, Sr. | 181/207 |
| 5,855,257 A | * | 1/1999 | Wickert et al. | 188/218 XL |
| 6,112,865 A | * | 9/2000 | Wickert et al. | 188/218 XL |
| 6,131,487 A | * | 10/2000 | Jackel et al. | 74/574 |

* cited by examiner

*Primary Examiner*—Christopher P. Schwartz
*Assistant Examiner*—Benjamin A Pezzlo
(74) *Attorney, Agent, or Firm*—Ray R. Regan

(57) ABSTRACT

An apparatus for reducing harmonics and vibrations of a rotatable base piece, such as a brake rotor to be resurfaced or refinished, is provided. A plurality of interconnected chain links are included. The plurality of chain links are sized for maximum contact with the rotatable base piece. The plurality of chain links are interconnected to form a belt assembly open at the ends. One or more demountably selectively attachable connectors for securing the belt assembly to the rotatable base piece also are included. In a preferred embodiment, the one or more demountably selectively attachable connectors is a spring member. Each spring member includes a nonidentical length arm extending monolithically from the ends of the spring member. In addition, a semi-circular hook members is provided on one end of the nonidentical length arm. No other mechanical structural elements are included.

19 Claims, 5 Drawing Sheets

APPARATUS FOR REDUCING HARMONICS AND VIBRATIONS OF A ROTATABLE BASE PIECE

CROSS-REFERENCE TO RELATED APPLICATION

As provided in 35 U.S.C. §120; applicant claims priority in this continuation-in-part nonprovisional patent application based on the copending provisional United States patent application filed by Kenneth Turos, the inventor named in this application, filed in the United States Patent and Trademark Office on Feb. 12, 1999, Application Ser. No 09/249, 514.

FIELD OF THE INVENTION

The present invention pertains generally to reducing harmonics and vibrations of a rotatable base piece during operation of a machine. More particularly, the present invention pertains to an apparatus for reducing harmonics and vibrations of a rotatable rotor removably attached to a rotatable machine member. The present invention is particularly, but not exclusively, useful for reducing harmonics and vibrations of a brake rotor attached to a rotatable machine member during a turning procedure.

BACKGROUND OF THE INVENTION

Gravity, friction, velocity of rotation, and load forces are applied during operation to bearings, drive shafts, driven shafts, turning spindles, rotors, retaining devices, and other components of driving and driven machines (collectively, "machine members"). Circular rotation of shafts mounted in bearings gives rise to centripetal force, a force that is reacted to by centrifugal reaction. Angular velocity and angular acceleration of rotatable base pieces subjected not only to certain velocities, but also to loads or pressure, also may induce gyroscopic effects on rotatable base pieces that are attached to a rotatable machine member turning or rotatable rapidly. Machine members, and base pieces attached to machine members, also may be subjected to significant loads about the geometric and rotational axes of a rotatable base piece. As is commonly known, when two forces act on a shaft, spindle, pin, axle or similar rod or assembly (collectively, "shaft"), a torque may be formed whose vector along an x-axis may produce a rotation about the y-axis known as precession. Such rotation may generate significant angular velocities. These forces, phenomena, torque and related effects may individually and collectively contribute to inducing nonuniform rotation of a base piece that has been attached to a rotatable shaft (collectively, "forces").

In connection with a rotatable machine member in which angular accelerations and velocities are present, unbalanced forces may lead to high harmonics and vibrations. Further, in some, but not all instances, if the speed of rotation of a shaft is slowly increased from rest, a speed may be achieved at which a deflection increases suddenly, a phenomenon known as "whirling." A shaft that is balanced will rotate around the center of gravity or axis of rotation of a shaft. If a shaft rotates at an angular velocity, however, the shaft may deflect a distance from the center of gravity or axis of rotation due to centripetal reaction. Rotation also may induce undamped free vibrations. All of these forces and phenomena, and others, may contribute to nonuniform rotation of the shaft, and consequent nonuniform rotation of a base piece attached to a machine member mounted on the shaft. This is particularly, but not exclusively, true in machine members on which brake rotors are mounted for turning purposes, such as refinishing or resurfacing a brake rotor. A machine used to refinish or resurface a brake rotor generally includes a driving motor, a driven or turning shaft, one or more retaining devices attached to the shaft for removably mounting a base piece such as a brake rotor on the one or more retaining devices, and one or more cutting tools that may engage a surface of a brake rotor to be refinished or resurfaced.

During refinishing or resurfacing of a base piece such as a brake rotor, the forces and phenomena described above may cause harmonics and vibrations that are transmitted to the brake rotor during rotation. Any nonuniform rotation of the brake rotor during operation may cause a cutting tool to produce an inferior refinished or resurfaced surface. While numerous apparatus have been suggested to attempt to reduce harmonics and vibrations in a rotatable base piece such as a brake rotor, none has proven entirely successful, and none has proven as useful and inexpensive as the present invention.

The problem to be solved, therefore, is reduction of harmonics and vibrations of a rotatable base piece that is removably attached to a rotatable machine member during operation of a machine. Further, what is needed is an apparatus for reducing harmonics and vibrations of a rotatable brake rotor, whether vented or unvented, that is useful for producing a more precisely turned and resurfaced brake rotor.

One of the advantages of the novel apparatus for reducing harmonics and vibrations of a rotatable base piece, according to the present invention, is that the apparatus for reducing harmonics and vibrations of a rotatable base piece produces a more precisely turned and resurfaced brake rotor. Another advantage of the present invention is an apparatus for reducing harmonics and vibrations of a rotatable base piece that dampens noises and vibrations during operation of the machine on which the rotatable base piece is removably attached. The present invention also has the advantage not only of simplicity, but a simplicity that results in enhanced mechanical advantages over other apparatus suggested for solving the problems. Further, contrary to accepted and conventional wisdom, applicant has established that using solely the structural elements disclosed and claimed in this document results in greater dampening, or greater reduction of harmonics and vibrations, when the present invention is used on a rotatable base piece such as a rotor like a brake rotor.

Thus, the present invention requires fewer components than is required for other apparatus, yet achieves significantly enhanced reduction of noises, vibrations and harmonics during operation. Specifically, the apparatus for reducing harmonics and vibrations of a rotatable base piece such as a brake rotor, according to the present invention, includes a series of chain links formed into a belt assembly. The two ends of the belt assembly are connectable to opposing ends of a connector. The connector includes, but is not limited to, a spring member that includes a trailing link and a following link. In operation, the present invention does not require more components than a belt assembly of chain links and a connector. Further, use of shorter length chain links to assemble the belt assembly of chain links, in combination with the nonidentical length arms extending monolithically from the ends of spring members of the present invention, applicant has established that adding any additional mechanical components to the invention would decrease the mechanical advantages of the present invention. Thus, no additional devices or apparatus need or should be added either to the belt assembly of chain links or to the connector to significantly enhance reduction of noises, vibrations and harmonics during operation. Thus, the present invention results in more efficient reduction of harmonics and vibrations without having to employ or deploy on the apparatus additional blocks, bands, clip members, tubes, disks, dampener blocks, and similar elements, regardless of shape or the material (collectively, "additional elements"). By omitting such additional elements, a user of the present invention is not concerned with whether the apparatus are in an "up" or "down" configuration when installed for use. Rather, any contact facet of the collar of each plate forming the interconnected chain links may be placed in contact with the surface of a rotatable base piece. Elimination of additional elements to the apparatus contributes to achieving significantly more dampening of harmonics and vibrations of a rotatable base piece.

In addition, use of comparatively small plates to make the chain links forming the belt assembly provides more surface contact between the belt assembly and the rotatable base piece, which also contributes to the capability of the present invention to more completely reduce vibrations and harmonics. Each of the plurality of interconnected chain links is sized for maximum contact with the contact surface of the rotatable base piece, thus providing significantly more contact facets that in turn provide significantly more surfaces that rest on the contact surface of the rotatable base piece during operation. The greater the totality of contact between the contact facets of the chain links, and the contact surface of the rotatable base piece, the greater the effect of reducing the problems associated with harmonics and vibrations.

At least one more mechanical advantage is provided by including in an embodiment of the present invention nonidentical length arms extending monolithically from one or more spring members, with substantially semi-circular hook members. Thus, the nonidentical length arms with substantially semi-circular hook members contribute to quick but secure locking of the belt assembly to a variety of different sized rotatable base pieces having different diameters by locking securely around the rods in the chain links in the trailing link and the following link. The nonidentical length arms with substantially semi-circular hook members contribute to quick but secure locking of the belt assembly to a variety of rotatable base pieces having different diameters even if the user elects to skip one or more chain links in the belt assembly. The secure locking achieved by the user's ability to select from one or more nonidentical length spring members further contributes to maximum continuous contact between the collars of the plates of the chain links, and the contact surface of the rotatable base piece, resulting in greater reduction of vibrations and harmonics.

Yet another advantage of the present invention is to provide a new and improved apparatus for reducing harmonics and vibrations of a rotatable base piece, such as a brake rotor, that may be easily and efficiently manufactured. Another advantage of the present invention is its durability and reliable construction. An even further advantage of an apparatus for reducing harmonics and vibrations of a rotatable base piece, according to the present invention, is its low cost of manufacture with regard to both materials and labor. Thus, another advantage of the present invention is a apparatus for reducing harmonics and vibrations of a rotatable base piece and a method for reducing harmonics and vibrations of a rotatable base piece which respectively are easy to use and to practice, and which are cost effective for their intended purposes.

These advantages and other objects and features of such apparatus for reducing harmonics and vibrations of a rotatable base piece will become apparent to those skilled in the art when read in conjunction with the accompanying following detailed description, drawing figures, and appended claims.

SUMMARY OF THE INVENTION

An apparatus for reducing harmonics and vibrations of a rotatable base piece, according to the present invention, includes a plurality of chain links. The plurality of chain links are interconnected to form a belt assembly the two ends of which are not interconnected. The belt assembly has a leading end and a following end. The chain links are interconnected between the leading end and the following end. An apparatus for reducing harmonics and vibrations of a rotatable base piece also includes at least a spring member. The spring member is connectable to the leading end and the following end of the belt. The spring member assists in mounting the belt a assembly to a rotatable base piece. The belt assembly, for example, may be attached to a rotatable brake rotor for reducing harmonics and vibrations of a rotatable base piece during rotation of the brake rotor.

More specifically, as will be shown below in greater detail, a system for reducing harmonics and vibrations of a rotatable base piece, such as a rotor like a brake rotor needing refinishing or other machining, includes interconnected chain links that are smaller than conventional or common practice. The smaller chain links are selected and sized for maximum contact with the rotatable base piece. In part this is achieved by forming chain links having a plurality of plates. The plates have opposing sides. A collar is formed between the opposing sides of each of the plates. At least two bores are formed through the plurality of plates between the opposing sides. A rod is removably insertable through each of the bores. The rod holds the chain links together, or may be removed to shorten the length of the belt assembly formed by the interconnected chain links having a leading end and a following end. The collar includes at least two contact facets. The at least two contact facets are positionable against a contact surface on the base piece. In addition, one or more demountably selectively attachable connectors for securing the plurality of chain links to the rotatable base piece is provided, preferably a spring member. The spring members are sized to accommodate varying dimensions of the at least one contact surface of the rotatable base piece. The spring members include nonidentical length arms extending monolithically from the ends of the spring members. A semi-circular hook member is included at each end of the nonidentical length arms for demountably locking securely the open-ended belt assembly to the at least one contact surface.

The foregoing has outlined broadly the more important features of the invention to better understand the detailed description that follows, and to better understand the contribution of the present invention to the art. Before explaining at least one embodiment of the invention in detail, it is to be understood that the invention is not limited in application to the details of construction, and to the arrangements of the components, provided in the following description or drawing figures. The invention is capable of other embodiments, and of being practiced and carried out in various ways. Also, the phraseology and terminology employed in this disclosure are for purpose of descriptions and should not be regarded as limiting.

As those skilled in the art will appreciate, the conception on which this disclosure is based may be readily used as a basis for designing other structures, cooperation of structure, methods, and systems for carrying out the purposes of the present invention. The claims, therefore, include such equivalent constructions to the extent the equivalent constructions do not depart from the spirit and scope of the present invention.

The abstract associated with this disclosure is neither intended to define the invention, which is measured by the claims, nor intended to be limiting as to the scope of the invention in any way.

The novel features of this invention, and the invention itself, both as to structure and operation, are best understood from the accompanying drawing, considered in connection with the accompanying description of the drawing, in which similar reference characters refer to similar parts, and in which:

DESCRIPTION OF THE PREFERRED EMBODIMENTS

Figure 1:
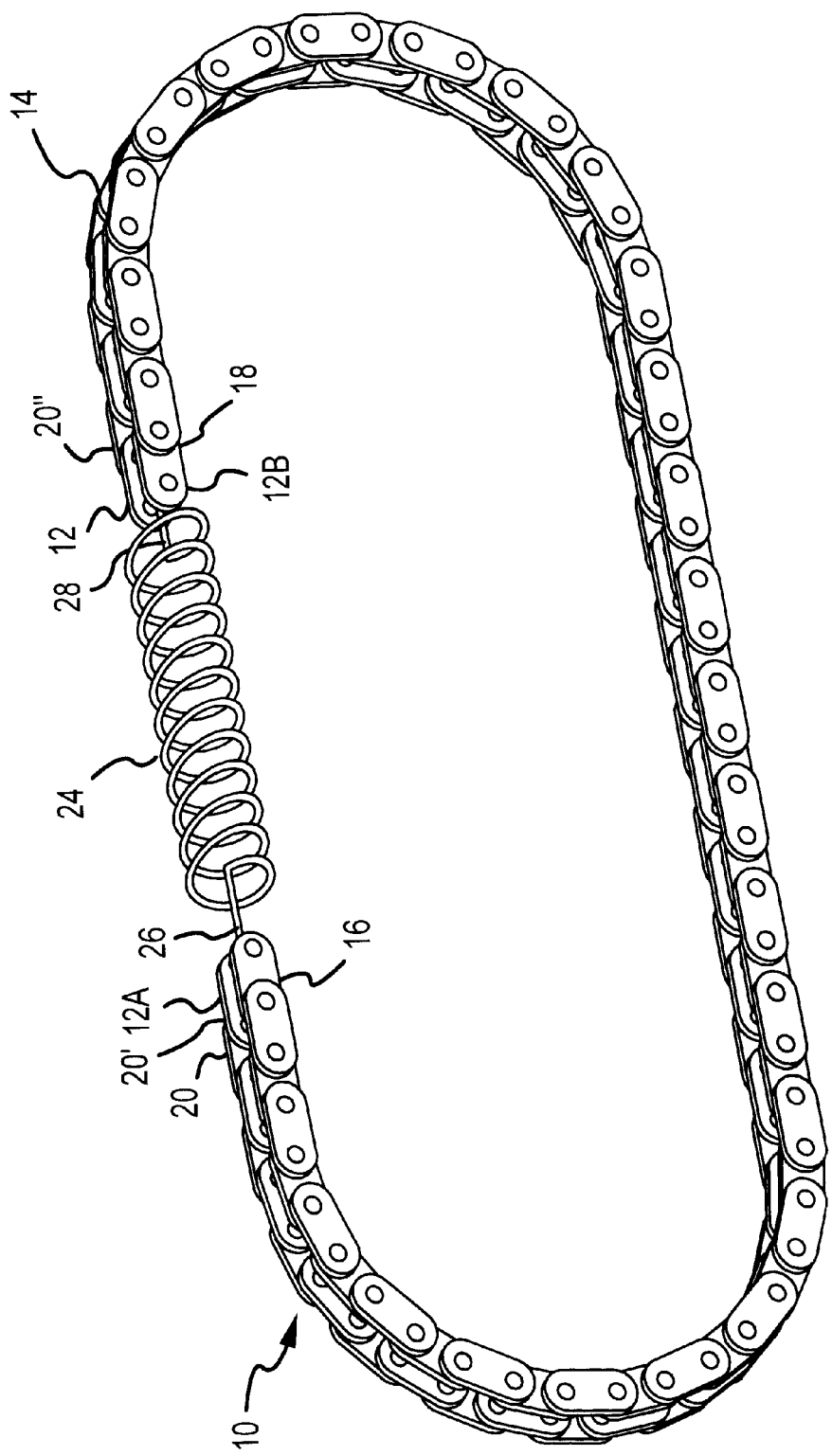
FIG. 1 is a perspective or isometric view of the apparatus for reducing harmonics and vibrations of a rotatable base piece.

Referring initially to FIG. 1, the apparatus for reducing harmonics and vibrations of a rotatable base piece is shown and generally designated 10. As shown, an apparatus for reducing harmonics and vibrations of a rotatable base piece 10 includes a plurality of chain links 12. Plurality of chain links 12 are interconnected to form a belt assembly 14. Belt assembly 14 has a leading end 16 and a following end 18. Leading end 16 and following end 18 are not interconnected with each other. Chain links 12 are interconnected between leading end 16 and following end 18.

As also shown in FIG. 1, an apparatus for reducing harmonics and vibrations of a rotatable base piece 10, also includes means for releasing each of the plurality of chain links 12 from a trailing chain link 12A or a following chain link 12B, and from belt assembly 14. In the preferred embodiment of the present invention, the means for releasing each of the plurality of chain links 12 from a trailing chain link 12A or a following chain link 12B, and from belt assembly 14 is a releasable rod 20. In the preferred embodiment of the present invention, chain links 12 are made of metal. In an alternative embodiment of the present invention each of the plurality of chain links 12 may be made of a resin material.

Figure 2A:
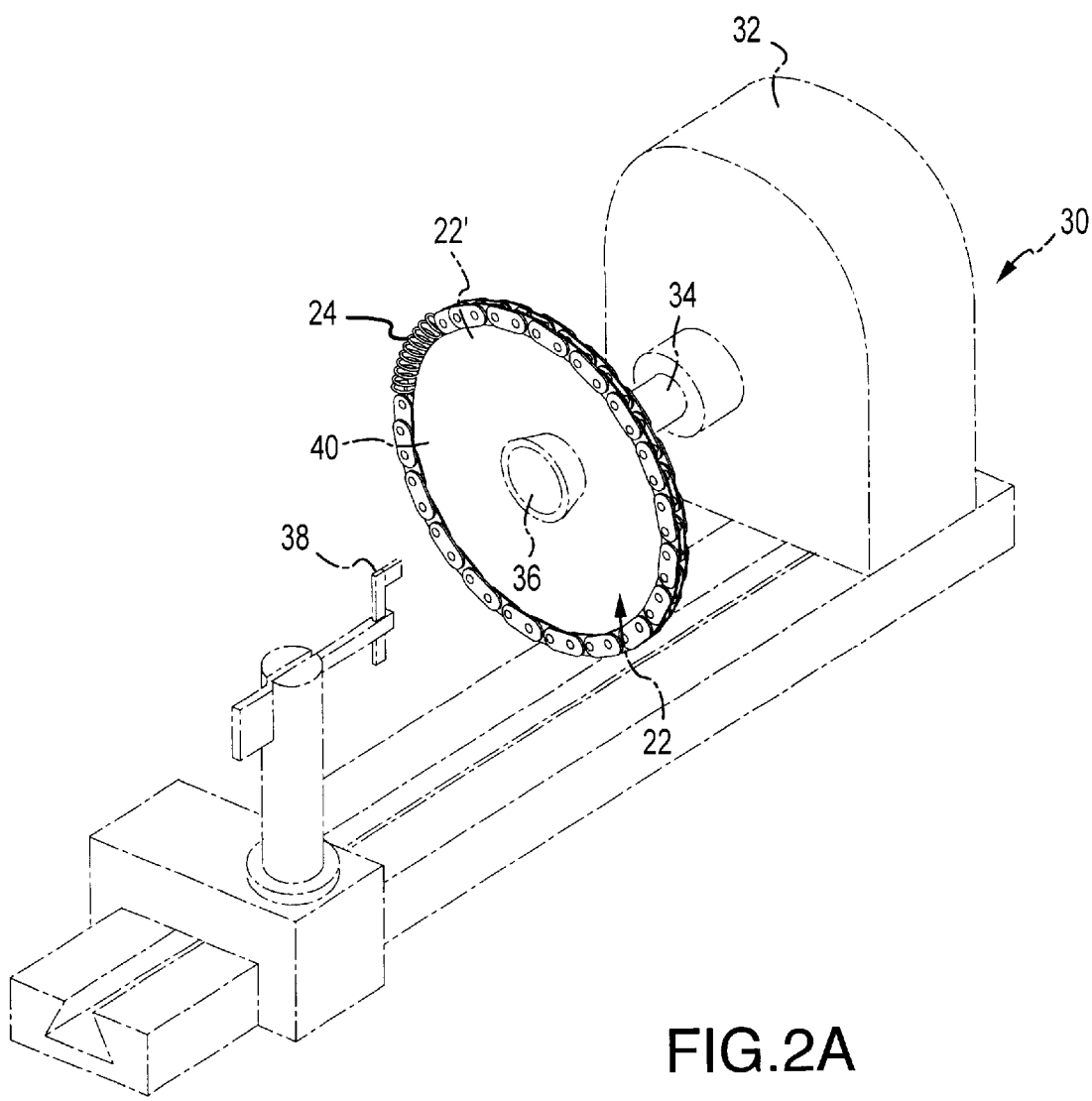
FIG. 2A is a perspective view of a representative machine, not claimed in the present invention, having a machine member to which a base piece may be removably mounted, and on which the present invention is mountable.

As shown best by cross-reference between FIGS. 1 and 2, an apparatus for reducing harmonics and vibrations of a rotatable base piece, according to the present invention, also includes means for attaching belt assembly 14 to base piece 22. In the preferred embodiment of the present invention, the attaching means is a spring member 24. Spring member 24 is formed with a first end 26 and a second end 28. In the preferred embodiment of the present invention, first end 26 and second end 28 are curved to facilitate engagement of first end 26 and second end 28 with a rod 20' and rod 20". First end 26 of spring member 24 is engageable with leading end 16 of belt assembly 14, and second end 28 of spring member 24 is engageable with following end 18 of belt assembly 14.

Referring now to FIG. 2, in the preferred embodiment of the present invention base piece 22 is a brake rotor 22". A machine 30 used to refinish or resurface a brake rotor 22' generally includes a driving motor 32, a driven or turning shaft 34, one or more retaining devices 36 attached to shaft 34 for removably mounting base piece 22, such as brake rotor 22' on one or more retaining devices 36, and a cutting tool 38 that may reciprocally engage a surface 40 of brake rotor 22' to be refinished or resurfaced.

During refinishing or resurfacing of base piece 22, such as a brake rotor 22', forces and phenomena described in this disclosure may cause harmonics and vibrations that are transmitted to brake rotor 22' during rotation of shaft 34. Lacking the dampening effect of the apparatus for reducing harmonics and vibrations of a rotatable base piece 10, according to the present invention, nonuniform rotation of brake rotor 22' during rotation of shaft 34 would cause cutting tool 38 to produce an inferior refinished or resurfaced surface 40 on composite brake rotors 22' and a variety of hubless brake rotors 22'.

Figure 2B:
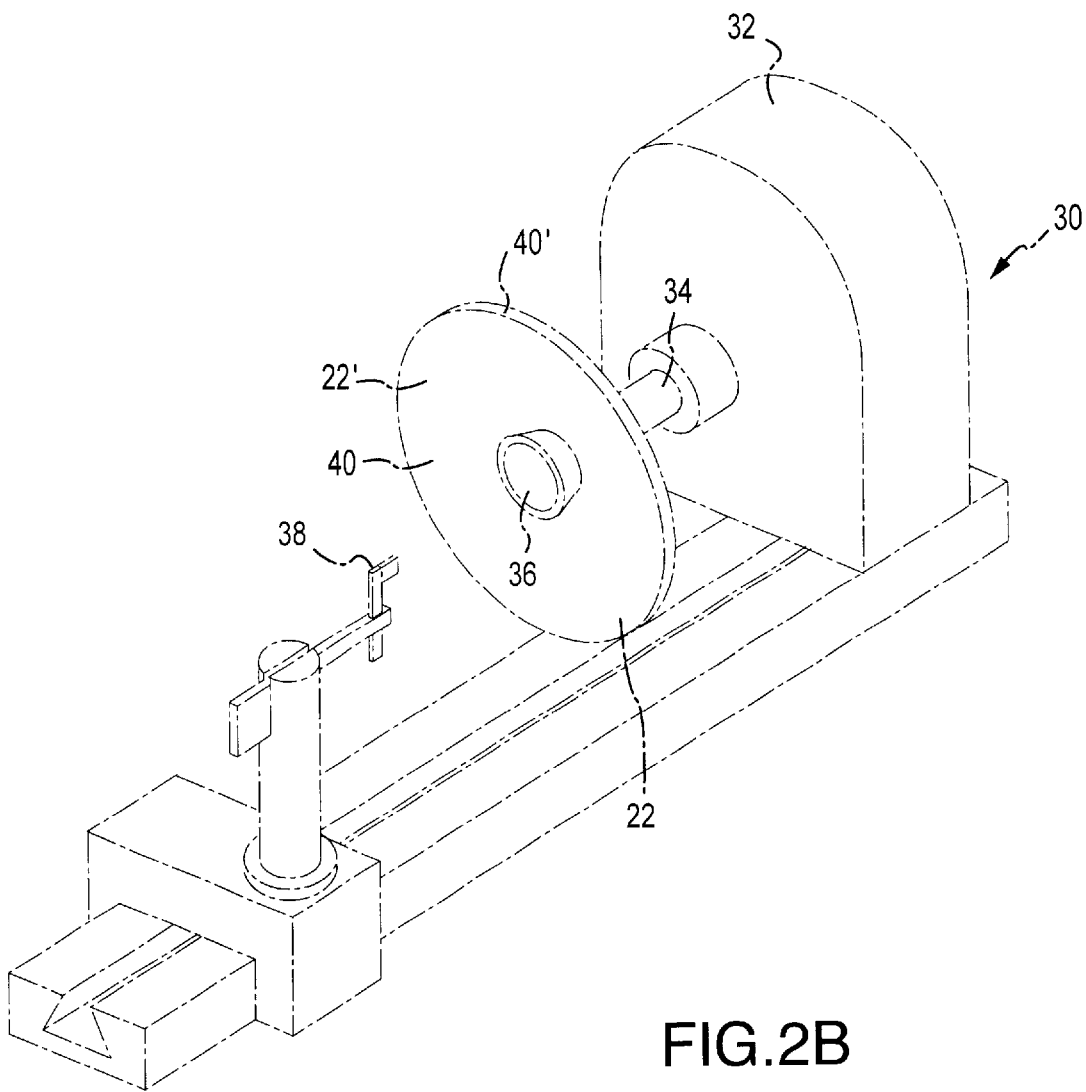
FIG. 2B is a perspective view of a representative machine, not claimed in the present invention, having a machine member to which a base piece may be removably mounted, but on which the present invention is not mounted.
Figure 3A:
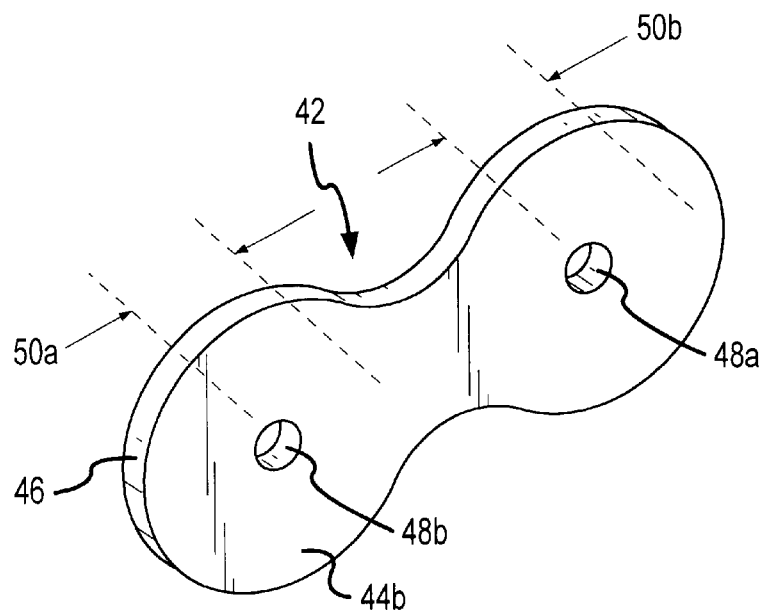
FIG. 3A is a perspective view of a plate of the present invention.
Figure 3B:
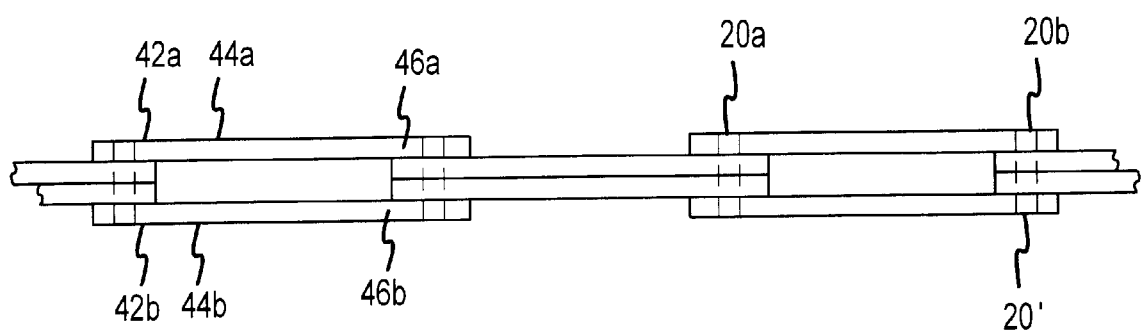
FIG. 3B is a top view, partially broken away, of a portion of the belt assembly of the present invention.

In a preferred embodiment of the present invention, system for reducing harmonics and vibrations of a rotatable base piece 10, such as a rotor 22' needing refinishing or other machining, includes interconnected chain links 12 that are smaller than conventional or common practice, and shorter in length. Chain links 12 are selected and sized for maximum contact with contact surface 40 of rotor 22', as best shown in FIG. 2B. In part this is achieved by forming chain links 12 having a plurality of plates 42, as best shown by cross-reference between FIGS. 3A and 3B. Plates 42 have opposing sides 44a,b. A collar 46 is formed between opposing sides 44a,b of each of plates 42. At least two bores 48a,b are formed through plurality of plates 42 between opposing sides 44a,b. Rods 20a,b are removably insertable through each of bores 48a,b. Rods 20a,b hold plates 42 of chain links 12 together, or may be removed to shorten the length of interconnected chain links 12 that in combination form belt assembly 14. Belt assembly 14, as indicated, includes a leading end 16 and a following end 18. Collar 46 includes at least two contact facets 50a,b, as best shown in FIG. 3A. The at least two contact facets 50a,b are positionable against a surface 40, as shown in FIG. 2 as contact surface 40' on rotatable base piece 22'.

Contrary to accepted and conventional wisdom, greater dampening, or greater reduction of harmonics and vibrations, is achieved by employing shorter length plates 42 than is conventional teaching suggests for solving the problems associated with vibration and harmonics. In part by shortening plates 42, and by not adding any other additional elements than is claimed in this document to apparatus for reducing harmonics and vibrations of a rotatable base piece 10, increased reduction of vibrations and harmonics is achieved during operation. The use of shorter than conventional chain links 12 to assemble belt assembly 14, in combination with nonidentical length arms extending monolithically from the ends of spring members of the present invention as described below, eliminates the need to add additional elements, and would appear to decrease the mechanical advantages of the present invention. As will be evident to a person skilled in the art, omission of additional elements to belt assembly 14 also eliminates concern with whether belt assembly 14 is in an "up" or "down" configuration when installed for use. Rather, belt assembly 14 may be placed in contact with contact surface 40' of brake rotor 22' by applying either face 52a or 52b to contact surface 40' of brake rotor 22', such that any contact facet 50a,b of collar 46 of plate 42 is in contact with contact surface 40' of rotor 22'.

In addition, use of short length plates 42 to assemble chain links 12 forming belt assembly 14 provides more surface contact between belt assembly 14 and contact surface 40' of rotor 22', which also contributes to the capability of the present invention to more completely reduce vibrations and harmonics. Each of the plurality of interconnected chain links 12 is sized for maximum contact with contact surface 40', thus providing significantly more contact with more contact facets 50a,b, in turn providing a chain of contacts that rest on contact surface 40' during operation. The greater the totality of contact between contact facets 50a,b of chain links 12, and contact surface 40', the greater the effect of reducing the problems associated with harmonics and vibrations.

Figure 4:
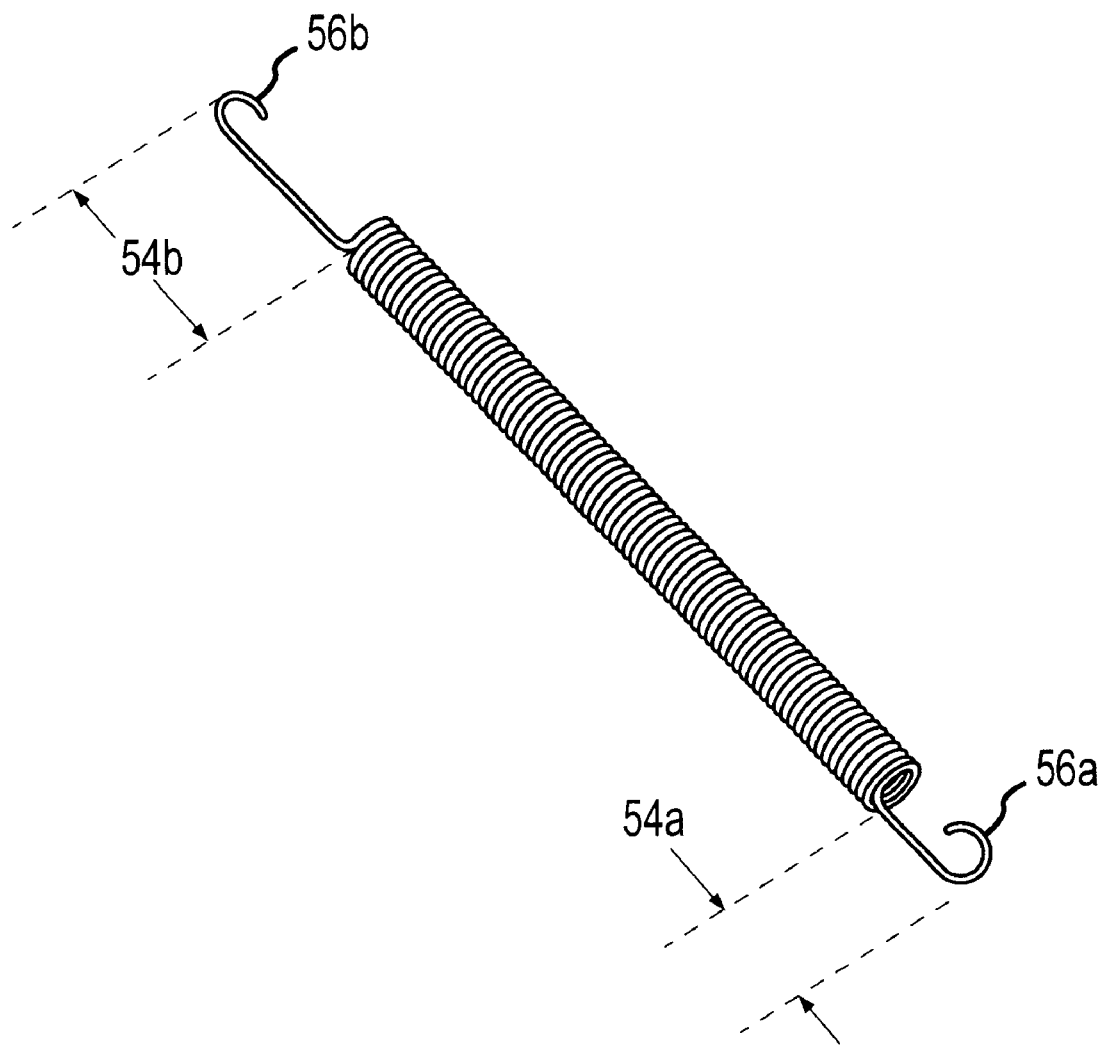
FIG. 4 is a perspective view of a spring member according to the present invention.

In addition, one or more demountably selectively attachable connectors 24' for securing plurality of chain links 12 to rotatable base piece 22, are provided. In a preferred embodiment of the present invention, one or more demountably selectively attachable connectors 24' is preferably a spring member 24. Spring member 24 is sized to accommodate varying dimensions of contact surface 40' of rotatable base piece 22, including rotor 22'. In a preferred embodiment of the present invention, as best shown in FIG. 4, spring member 24 includes nonidentical length arms 54a,b extending monolithically from the ends of spring member 24. Thus, one nonidentical length arm 54a is shown to be shorter than nonidentical length arm 54b in FIG. 4. In addition, semi-circular hook member 56a,b is included at each end of nonidentical length arm 54a and 54b for demountably locking each of semi-circular hook member 56a,b securely around at least two rods 20a,b respectively in trailing link 12A and following link 12B, thus securing belt assembly 14 to contact surface 40'. At least one mechanical advantage is provided by including in an embodiment of the present invention nonidentical length arms 54a,b extending monolithically from one or more spring members 24 with substantially semi-circular hook members 56a,b. Nonidentical length arms 54a,b with substantially semi-circular hook members 56a,b contribute to quick but secure attachment of belt assembly 14 to a variety of rotatable base pieces 22 having contact surface 40' in varying lengths or diameters. Further, nonidentical length arms 54a,b with substantially semi-circular hook members 56a,b contribute to quick but secure locking of belt assembly 14 to a variety of rotatable base pieces having different diameters even if a user of the invention elects to skip one or more chain links 12 in belt assembly 14. The secure locking achieved by the capability to select from one or more nonidentical length spring members 24 further contributes to maximum continuous contact between collar 46 in each of chain links 12 of plates 42, and contact surface 40' of rotatable base piece 22, resulting in greater reduction of vibrations and harmonics.

While the apparatus for reducing harmonics and vibrations of a rotatable base piece shown in the drawing figures is one embodiment of the present invention, it is merely one embodiment of the invention, is not intended to be exclusive, and is not a limitation of the present invention.

The particular apparatus for reducing harmonics and vibrations of a rotatable base piece as shown and disclosed in detail in this instrument is fully capable of obtaining the objects and providing the advantages stated, but this disclosure is merely illustrative of the presently preferred embodiments of the invention, and no limitations are intended in connection with the details of construction, design or composition other than as provided and described in the appended claims.

What is claimed is:

1. A system for reducing harmonics and vibrations of a rotatable base piece, comprising:

a plurality of interconnected chain links, each said chain link including a plurality of plates, at least two bores formed through the plurality of plates, and at least two rods through each of the at least two bores, wherein each said plate includes opposing sides defining a collar therebetween, said collar including at least two contact facets configured to face in substantially the same direction; and one or more demountably selectively attachable connectors for securing the plurality of chain links to the rotatable base piece.

2. A system for reducing harmonics and vibrations of a rotatable base piece as recited in claim 1, wherein the rotatable base piece further comprises at least one contact surface.

3. A system for reducing harmonics and vibrations of a rotatable base piece as recited in claim 1, wherein each of the plurality of chain links is assembled as an open-ended belt assembly having a leading end and a following end.

4. A system for reducing harmonics and vibrations of a rotatable base piece as recited in claim 1, wherein the at least two contact facets are positionable against the at least one contact surface of the rotatable base piece.

5. A system for reducing harmonics and vibrations of a rotatable base piece as recited in claim 1, wherein the one or more demountably selectively attachable connectors are spring members.

6. A system for reducing harmonics and vibrations of a rotatable base piece as recited in claim 5, wherein the spring members are sized to accommodate varying dimensions of the at least one contact surface of the rotatable base piece.

7. A system for reducing harmonics and vibrations of a rotatable base piece as recited in claim 6, wherein the spring members include nonidentical length arms extending monolithically from the ends of the spring members.

8. A system for reducing harmonics and vibrations of a rotatable base piece as recited in claim 7, wherein the nonidentical length arms include substantially semi-circular hook members shaped for demountably locking securely the open-ended belt assembly to the at least one contact surface.

9. A method for reducing harmonics and vibrations on a rotatabale rotor, comprising:

interconnecting a plurality of chain links to form a belt assembly;

forming the plurality of chain links to be removably connectable to the belt assembly;

identifying at least one contact surface on the rotor;

forming each of the plurality of chain links with a plurality of plates, at least two bores through the plurality of plates, and at least two rods through each of the at least two bores, wherein each said plate includes opposing sides defining a collar therebetween, said collar including at least two contact facets configured to face in substantially the same directions;

sizing the plurality of chain links for maximum contact between the belt assembly and the contact surface of the rotor; and securing the belt assembly to the rotor with a spring member selectively adaptable to the dimensions of the rotor.

10. A method for reducing harmnonics and vibrations on a rotatable rotor as recited in claim 9, wherein the sizing step includes the substep of selecting the smallest length of plate consistent with the collective mass of the plurality of chain links appropriate to reduce harmonics and vibrations.

11. A method for reducing harmonics and vibrations on a rotatable rotor as recited in claim 9, wherein the securing step includes the substep of selecting a spring member sized to accommodate the dimensions of the rotor.

12. A method for reducing harmonics and vibrations on a rotatable rotor as recited in claim 11, wherein the securing step includes the substeps of:

extending nonidentical length arms monolithically from opposite ends of the spring member;

shaping one end of each of the nonidentical length arms to form a substantially semi-circular hook member; and removably locking the substantially semi-circular hook member to the removable rod in each end of the belt assembly.

13. An apparatus for reducing harmonics and vibrations of a rotatable rotor, consisting essentially of:

a plurality of interconnected chain links, each said chain link including a plurality of plates, at least two bores formed through the plurality of plates, and at least two rods through each of the at least two bores, wherein each said plate includes opposing sides defining a collar therebetween, said collar including at least two contact facets configured to face in substantially the same direction; and one or more demountably selectively attachable connectors for securing the plurality of chain links to the rotatable base piece.

14. An apparatus for reducing harmonics and vibrations of a rotatable rotor as recited in claim 13, wherein the rotatable rotor further comprises at least one contact surface.

15. An apparatus for reducing harmonics and vibrations of a rotatable rotor as recited in claim 13, wherein each of the plurality of chain links is formed as an open-ended belt assembly having a leading end and a following end.

16. An apparatus for reducing harmonics and vibrations of a rotatable rotor as recited in claim 15, wherein the at least two contact facets are contactable with the at least one contact surface of the rotatable rotor.

17. An apparatus for reducing harmonics and vibrations of a rotatable rotor as recited in claim 13, wherein the one or more demountably selectively attachable spring members is sized to accommodate varying contact surface lengths.

18. An apparatus for reducing harmonics and vibrations of a rotatable rotor as recited in claim 13, wherein the spring members include nonidentical length arms extending monolithically from the spring members.

19. An apparatus for reducing harmonics and vibrations of a rotatable rotor as recited in claim 18, wherein the nonidentical length arms include substantially semi-circular hook members shaped for demountably securely locking the leading end and a following end of the open-ended belt assembly to the at least one contact surface of the rotatable rotor.

\* \* \* \* \*